United States Patent [19]

Walters et al.

[11] Patent Number: 5,081,965

[45] Date of Patent: Jan. 21, 1992

[54] INTAKE VALVE FOR INTERNAL COMBUSTION ENGINE

[75] Inventors: Craig E. Walters, Spokane, Wash.; Victoria H. Bravender, Boca Raton; Carl J. Shuhi, Boynton Beach, both of Fla.

[73] Assignee: Warr Valves, Inc., Boca Raton, Fla.

[21] Appl. No.: 568,249

[22] Filed: Aug. 15, 1990

[51] Int. Cl.$^5$ ............................................. F01L 3/20
[52] U.S. Cl. ........................... 123/188 AA; 123/188 A; 123/188 M; 123/188 AF
[58] Field of Search .... 123/188 A, 188 AA, 188 AF, 123/188 M

[56] References Cited

U.S. PATENT DOCUMENTS 4,159,011  6/1979  Sperry ..................... 123/188 M
4,881,500  11/1989  Kojima et al. ............ 123/188 AA

FOREIGN PATENT DOCUMENTS 2115486A  9/1983  United Kingdom .

Primary Examiner—E. Rollins Cross
Assistant Examiner—Erick Solis
Attorney, Agent, or Firm—Harry W. Barron

[57] ABSTRACT

A valve for an internal combustion engine has a stem and head with differing diameters for the stem and the upper portion of the head. A radially irregular blend region placed between the stem and upper head is aligned to have a slight runout, that is, the axis of the blend region is not coaxial with the axes of the stem and head. The blend region is positioned on the valve to be below the valve guide when the valve is closed and in the flowpath of the fuel mixture when the valve is open. The radially irregular blend region creates additional turbulence which focuses the fuel mixture into the opening between the open valve head and cylinder head, thereby increasing the velocity of the fuel through the opening. In addition, a post in the fuel passageway deflects the fuel around the wider portion of the valve head.

15 Claims, 1 Drawing Sheet

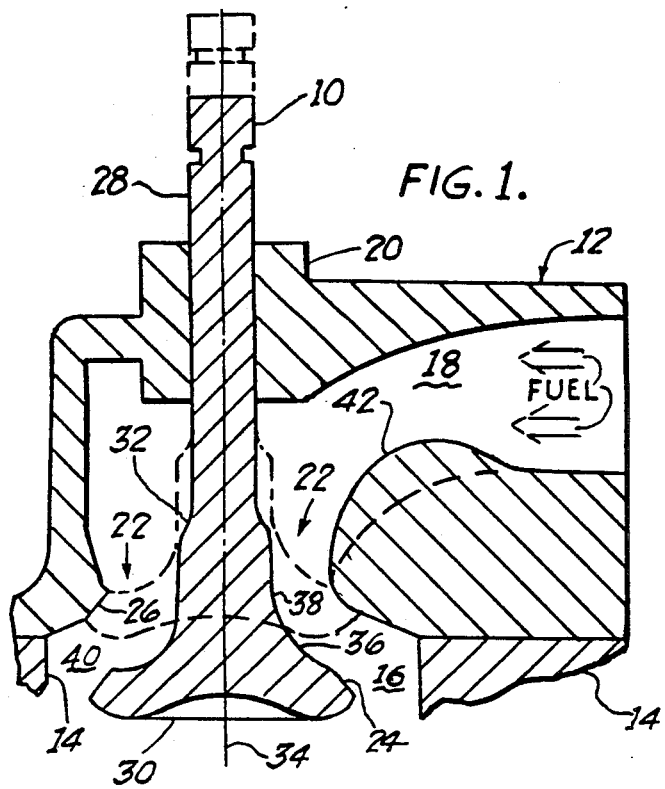
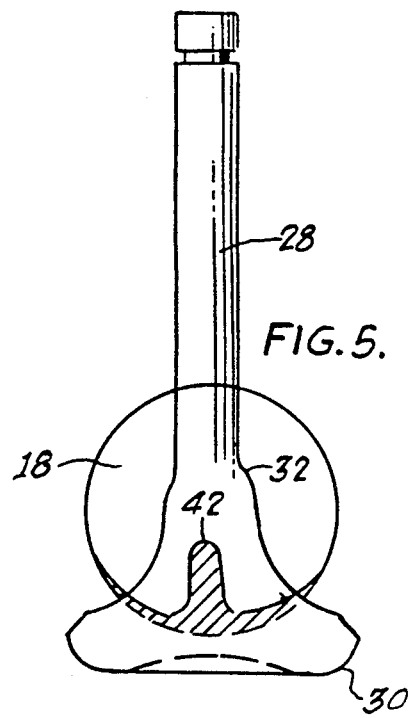
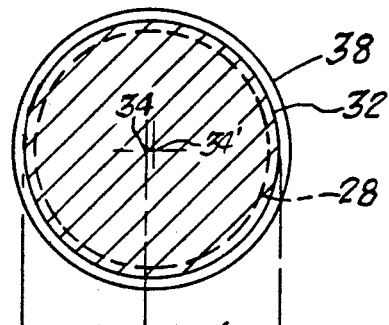
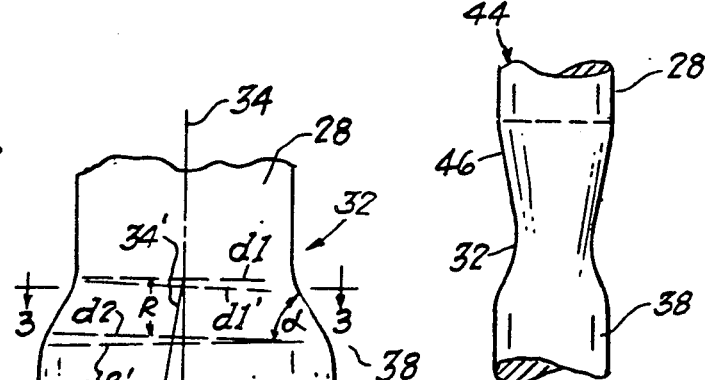
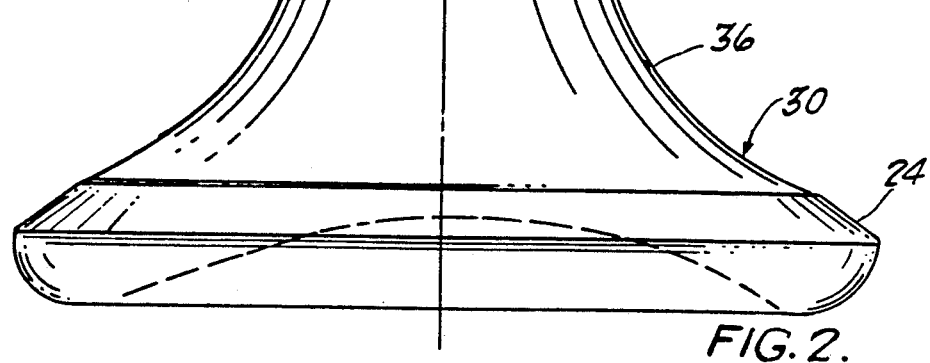

INTAKE VALVE FOR INTERNAL COMBUSTION ENGINE

FIELD OF THE INVENTION

This invention relates to an improved intake valve for an internal combustion engine, and more particularly, to such a valve having a conventional stem and head and a blending area between the stem and head for focusing the flow of the fuel mixture through the engine cylinder head-cylinder block opening, thereby increasing the velocity of the flow.

BACKGROUND OF THE INVENTION

Conventional internal combustion engines include an engine or cylinder block for containing a plurality of movable pistons in corresponding cylinders. One end of each cylinder has an opening connected to a fuel passageway through an engine or cylinder head and an intake valve is moved between one position sealed against the opening and a second position spaced from the opening. A conventional intake valve has a valve head sized to be sealed against the opening in a known manner and a cylindrical stem extending upward from the valve head through a valve guide in the fuel passageway. The valve stem slides through the valve guide in moving between the open and sealed positions and means are provided in the engine to move the valve in a known manner to permit fuel to enter the engine block during an appropriate one of the cycles of engine operation.

DESCRIPTION OF THE PRIOR ART

In any internal combustion engine, it is desirable to have the maximum amount of fuel mixture enter the engine block during the minimum amount of time. Opening the valve for a longer period is not a valid solution because of the additional time; further, increasing the space between the valve head and cylinder opening is also not a valid solution because of the additional time needed to move the valve the extra distance. In the past, people have proposed many solutions to increase the fuel flowing into the cylinder. For example, in U.S. Pat. No. 4,779,584, granted Oct. 25, 1988 in the name of Warren Mosler, and entitled, "Internal Combustion Engine Intake Valve", assigned to the assignee hereof, an intake valve is disclosed having an aerodynamic design on the downstream portion of the valve head. As used herein, downstream with respect to the valve head means the portion thereof below the portion thereof which seats with the cylinder head apparatus, whereas, upstream means the portion of the valve head above the seat portion.

Many others have suggested making modifications on the upstream portion of the valve head, as well. For example, in U.S. Pat. No. 3,757,757 in the name of Dirk Bastenhof, granted Sept. 11, 1973 and entitled, "Internal Combustion Engine Intake Valve Provided With A Deflector Plate", a deflector plate is provided on the upstream side of the valve head to increase the turbulence of the fuel flow. Others have provided fins or ribs on the upstream side of the valve head, such as shown in U.S. Pat. No. 3,090,370, Granted May 21, 1963 in the name of H. W. Kimball and entitled, "Combustion Engine Valve" and U.S. Pat. No. 1,750,995, granted Mar. 18, 1930 in the name of L. E. Edwards and entitled, "Engine Valve", for the purpose of increasing the speed of the fuel flow, as well as for the purpose of creating additional turbulence to better mix the fuel and air. Another attempt to increase the amount of fuel flowing is described in British Patent Application 2,115,486A, published Sept. 7, 1983, in the name of R. H. Slee, entitled "I. C. Engine Valve Form", where an increase in the transition area between the stem and head was suggested to increase the fuel flow by reducing the turbulence.

A series of patents disclose valves which appear to ignored the generally accepted prior art teachings that a smooth transition is desired between the stem and head. Generally, these patents involve a two (or more) piece valve structure in which a lip is created where the valve stem is attached to the valve head. For example, such structure is shown in U.S. Pat. No. 4,838,218 granted June 13, 1989 in the name of Y. Sato et al, entitled, "Ceramic Valve Supporting Structure In Use For Internal Combustion Engine"; U.S. Pat. No. 4,834,036 granted May 30, 1989 in the name of Y. Nishiyama et al, entitled, "Composite Valve For Reciprocating Engines and Method For Manufacturing The Same"; U.S. Pat. No. 4,073,474 granted Feb. 14, 1978 in the name of K. Hashimoto et al, entitled, "Poppet Valve"; U.S. Pat. No. 2,037,340 granted Apr. 14, 1936 in the name of G. R. Rich entitled, Composite Metal Article Of Manufacture"; U.S. Pat. No. 1,824,322 granted Sept. 22, 1931 in the name of M. J. Boyle entitled, "Valve And Method Of Manufacturing The Same"; U.S. Pat. No. 1,767,409 granted June 24, 1930 in the name of W. H. Spire et al entitled, "Valve"; U.S. Pat. No. 1,644,793 granted Oct. 11, 1927 in the name of G. R. Rich entitled, "Valve Tappet And Analogous Articles"; U.S. Pat. No. 1,506,900 granted Sept. 2, 1924 in the name of A. Greiner et al entitled, "Valve"; U.S. Pat. No. 1,583,432 granted May 4, 1926 in the name of M. M. Wilcox entitled, "Poppet Valve"; and U.S. Pat. No. 987,757 granted Mar. 28, 1911 in the name of J. W. Smith et al entitled, "Valve".

In U.S. Pat. No. Re. 14,412 granted Dec. 18, 1917 in the name of R. L. Ellery (based upon U.S. Pat. No. 1,141,870 granted June 1, 1915) entitled, "Valve", an exhaust valve is disclosed having a bulbous enlargement on the stem to reinforce the stem against damage due to the escaping hot gases.

SUMMARY OF THE INVENTION

In accordance with one aspect of this invention, there is provided in an intake valve for an internal combustion engine having a stem of a generally cylindrical shape sized to axially move in a guide within said engine and a head for being moved between open and closed positions as said stem is moved in said guide, the improvement of a radially irregular blend region between said stem and said head.

BRIEF DESCRIPTION OF THE DRAWINGS

One preferred embodiment of the subject invention is hereafter described, with specific reference being made to the following Figures, in which:

FIG. 1 shows the improved valve of the subject invention positioned in the fuel passage of a conventional internal combustion engine;

FIG. 2 is an enlarged view of the improved valve of the subject engine;

FIG. 3 shows a cross-sectional view taken across lines 3—3 of FIG. 2;

FIG. 4 shows an alternate embodiment of the improved valve of the subject invention; and FIG. 5 shows a view of the improved valve and fuel passage.

DETAILED DESCRIPTION

Referring now to FIG. 1, an improved intake valve 10 fabricated according to the subject invention is shown. Valve 10 is shown positioned between a cylinder head 12 and cylinder block 14. Cylinder head 12 fits above cylinder block 14 forming a cylinder 16, which contains an oscillating piston (not shown) operating in a conventional manner in an internal combustion engine. Cylinder head 12 includes a fuel passageway 18 for permitting a mixture of air and fuel to flow therethrough from a fuel system (not shown), such as a carburetor or electronic fuel injector, to cylinder 16. Valve 10 slides through a valve guide 20 fabricated in cylinder head 12 and is moved up and down by a conventional oscillating cam timing mechanism (not shown). When valve 10 is in the down position, as illustrated by the solid line depiction thereof, an opening 22 between cylinder head 12 and cylinder block 14 into cylinder 16 is present. Conversely, when valve 10 is in the up position, as illustrated by the dashed line depiction thereof, the opening 22 is closed by the sealing between the flat 24 on valve 10 and a corresponding seat 26 positioned on the bottom of cylinder head 12.

In any internal combustion engine, one goal of the design is to pass as much fuel as possible in a given time through opening 22 when valve 10 is displaced away from cylinder head 12. Generally, another design goal is to maintain the time the valve 10 is displaced from the head 12 as short as possible. One manner of accomplishing both of these goals is to increase the velocity of the fuel moving through opening 22.

Valve 10 has been designed to increase the velocity of the fuel traveling through opening 22 when valve 10 is displaced from cylinder head 12. While valve 10 is a single piece of material, such as stainless steel, it may be considered as containing three separate regions. The uppermost region is the stem region 28, which has a cylindrical shape of conventional radius, length and design based upon the engine in which it is to be used. For example, the radius of stem region 28 is selected to permit the stem to easily slide through valve guide 20 and the length thereof is selected to permit appropriate timing cam mechanisms to be affixed to the top end thereof in a known manner. The lowermost region of valve 10 is the head region 30, which again has a conventional diameter and design based upon the engine in which it is to be used. Both the head region 30 and the stem region 28 have a common axis 34. Head region further includes an expanding diameter region 36 from a cylindrical upper region 38 to the flat 24.

In conventional valves, the diameter of the upper head region and the diameter of the stem are the same. As will be hereafter described, this is not the case in valve 10, where the diameter of upper head region 38 is greater in diameter than the diameter of stem 26 and blend region 32 is positioned therebetween. The difference in the diameter of stem 26 and the diameter of upper head region 38 may be 0.044 inches, for example. Blend region 32 is positioned so that it is entirely below the bottom of valve guide 20 when valve 10 is in the sealed position with flat 24 being against seat 26, as seen by the dashed lines in FIG. 1. Further, blend region 32 is positioned so that it is directly in the flowpath of the fuel when in the open position, as seen by the solid lines in FIG. 1.

Referring now to FIGS. 2 and 3, an enlarged view of blend region 32 is shown. Blend region 32 increases in diameter over a finite length L, which may be approximately 0.050 to 0.060 inches, from the diameter of stem 28 to the diameter of the upper portion 38 of head 30. In addition, blend region 32 may be placed approximately one inch from the bottom of valve 10. Blend region will curve into and out of a generally 45° to 50° angle relative to the axis 34 of valve 10, indicated as angle $\alpha$ in FIG. 2, with the curve between the stem 28 and blend region 32 being much more gentle than the curve between the blend region 32 and the head 30. The above noted sizes and angles are exemplary only and many other sizes or angles for blend region 32 may be utilized. For example, the average angle of the blend region may be as small as 20° to 30°. Further, the various sizes noted above of each valve fabricated according to this invention will have to be designed specifically for each different engine with which it is intended for use.

In addition to the shape described in the preceding paragraph, blend region 32 is formed to have a slight runout, that is, the axis 34' of blend region 32 is not coaxial, with the axis 34 of stem 28 or head 30. It is this last feature which provides the benefit achieved by the improved valve 10 over similar constructed valves of the prior art, such as those shown in the aforementioned U.S. Patents disclosing multi-piece valve with a transition between the stem and head. The amount of runout should be small, in the order of 0.002 to 0.005 inches and a smooth transition between the ends of blend region 32 and stem 28 and head 30 respectively should be maintained. Thus, the diameter d1 of stem 28 and the diameter d1' at the upper end of blend region 32 are equal in length, but are offset from one another by a slight angle. Similarly, the diameter d2 of stem 28 and the diameter d2' at the lower end of blend region 32 are equal in length, but are offset from one another by the same slight angle. The amount of the runout may be best seen in FIG. 3, where a difference in length of radius r1 and radius r1' is equal to the runout. This runout is due to the difference in the center axis 34 of valve 10 and center axis 34' of blend region 32. Thus, blend region 32 may be referred to as radially irregular.

Referring to FIG. 4, an alternate embodiment of the blend region 38 of the improved valve 44 is shown. In the case of valve 44, a coaxial inward taper 46 is shown from the stem 28 towards the beginning of blend region 38. Taper 46 may begin at the exit point from valve guide 20 when valve 44 is fully extended, as shown by the solid lines in FIG. 1, and may extend to slightly above the non-coaxial blend region 38. For example, the stem 28 may have a diameter of 11/32 inches and the diameter at the beginning of blend region may be 5/16 inches.

Referring again to FIG. 1, when valve 10 having the radially irregular blend region 32, is placed in cylinder head 12 such that the blend region 32 is in the path of the flowing fuel mixture, a slight amount of additional turbulence is formed due to the non-coaxial relationship of axes 34 and 34'. By properly designing the blend region 32, the turbulence can effectively be focused in opening 22, and specifically on the far portion 40 of opening 22. By focusing the additional turbulence in portion 40 of opening 22, an increase in the velocity of the fuel mixture will occur at portion 40. Since portion 40 is the portion of opening 22 where a majority of the fuel mixture flows in any event, the increase in velocity will increase the amount of fuel entering cylinder chamber 16 in a given time.

Referring now to FIGS. 1 and 5, additional improvements in fuel delivery has been found to occur if a deflector post 42 in fabricated on the floor of passageway 18. Post 42 is designed to deflect the fuel mixture flowing at the bottom of passageway 18 slightly away from the center of valve 10 and towards opening 22. In so doing, it increases the overall velocity of the flowing fuel mixture. The portion of the fuel flowing on the bottom of passageway 18 generally would be blocked by the wider portion of valve head 30 and post 42 merely redirects the flowing fuel mixture around valve head 30 and towards the opening 22. The result is that a smaller displacement between valve 10 and cylinder head 12, sometimes called low lift, will permit more fuel to pass through opening 22. In other words, deflector post 42 will provide an improvement in any port by directing low speed fuel at low lifts without causing high lift disruptions.

The combination of post 42 and radially irregular blend region 32 function together to permit overall lower lifts to be utilized in operating an internal combustion engine, thereby requiring shorter times to open and close valve 10. Of course, either could be used alone to achieve improved results. For example, tests performed with valve 10 (having the radially irregular blend region 32 as described herein) placed in a conventional General Motors 2.5 L engine, have produced increases in the flow of up to fifteen for low lifts of up to 0.25 inches and up to fifteen percent for higher lifts between 0.25 and 0.45 inches. With the addition of post 42, the increase in flow rate was ten percent for low lifts and three percent for higher lifts.

What is claimed is:

1. In an intake valve for an internal combustion engine having a stem of a generally cylindrical shape sized to axially move in a guide within said engine and a head for being moved between open and closed positions as said stem is moved in said guide, the improvement comprising a radially irregular blend region between said stem and said head.

2. The invention according to claim 1 wherein said engine includes a flow passageway through which fuel flows into an engine block, said valve moving angularly, with respect to said flowing fuel, through said passageway, and said blend area being positioned to be in said passageway.

3. The invention according to claim 2 wherein said radially irregular blend region includes a runout of between two and five thousandths of an inch.

4. The invention according to claim 3 wherein said passageway includes deflector means for deflecting said fuel around the portion of said head remote from said blend region.

5. The invention according to claim 4 wherein said deflector means includes a post on the floor of said passageway centered in the direction of said fuel flow with respect to said valve head.

6. The invention according to claim 2 wherein said passageway includes deflector means for deflecting said fuel around the portion of said head remote from said blend region.

7. The invention according to claim 6 wherein said deflector means includes a post on the floor of said passageway centered in the direction of said fuel flow with respect to said valve head.

8. The invention according to claim 1 wherein said radially irregular blend region includes a runout of between two and five thousandths of an inch.

9. An internal combustion engine comprising:
an engine block having an opening therein;
a passageway connected to said opening;
means for mixing fuel and air and for causing said mixture to flow through said passageway; and
an intake valve positioned through said passageway, said valve being movable between first and second positions to respectively open and close said opening, said valve including a stem, a head and a blend region between said stem and head, said blend region being radially irregular and positioned in said passageway and non-coaxial with said stem and head.

10. The invention according to claim 9 wherein said blend area increases the velocity of said fuel mixture through said opening when said valve is in said first position.

11. The invention according to claim 10 wherein said blend region is non-coaxial with said stem and head.

12. The invention according to claim 11 wherein blend region is positioned on said valve to be in the flowpath of the fuel mixture flowing through said passageway.

13. The invention according to claim 12 wherein said passageway includes means for deflecting the said fuel mixture around the portion of said head remote from said blend region.

14. The invention according to claim 13 wherein said deflecting means includes a post on the floor of said passageway centered in the direction of said fuel flow with respect to said valve head.

15. The invention according to claim 9 wherein said passageway includes means for deflecting the said fuel mixture around the portion of said head remote from said blend region.

* * * * *